Patented May 17, 1932

1,859,140

UNITED STATES PATENT OFFICE

HENRY BOHN HASS AND JERRY REUBEN MARSHALL, OF LA FAYETTE, INDIANA

PROCESS FOR THE MANUFACTURE OF ALKYL CYANIDES

No Drawing. Application filed December 6, 1929. Serial No. 412,279.

This invention relates to new and useful improvements in processes for the manufacture of alkyl cyanides.

It has been known for a long time that alkyl iodides react with metallic cyanides with much greater rapidity than is the case with alkyl bromides, and that alkyl bromides react more readily than the corresponding chlorides. On the other hand, the alkyl chlorides are much more readily available commercially than the bromides or iodides, because of the relative cheapness of chlorine as compared to bromine and iodine.

We have found that the metathetical reaction between alkyl chlorides and sodium iodide of the following type,

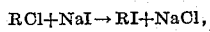

is much more rapid than the corresponding reaction involving sodium cyanide, so that the reaction between an alkyl chloride and sodium cyanide can be greatly hastened by the addition of sodium iodide to the reaction mixture.

The mechanism is as follows:

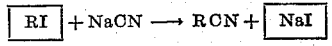

It is evident that the sodium iodide is regenerated when the alkyl iodide reacts with the sodium cyanide and therefore plays the role of a catalyst of the intermediate compound formation type. It is manifest that the same effect can be produced if the corresponding organic iodide is used such as MeI, EtI, PrI, BuI and AmI for example which is capable of reacting with the metallic cyanide to form a metallic iodide. The following example serves to illustrate the process:

33 kg. of sodium cyanide and 19 kg. of sodium iodide are agitated with 90 liters of a mixture of 80% ethanol and 20% water by weight. After the solution has become approximately saturated at its boiling point, 53 kg. of amyl chloride are added. The solution is agitated while maintained at its boiling point for 24 hours; at the end of which time the precipitated sodium chloride is separated by filtration from the solution containing the sodium iodide and unchanged sodium cyanide and the amyl cyanide is separated by rectification. The yield of amyl cyanide is substantially quantitative.

The solvent used should be one in which each of the reactants is considerably solvent.

From the foregoing it is believed that the invention may be readily understood by those skilled in the art, and we are aware that changes may be made in the details set forth without departing from the spirit of the invention as covered in the appended claims.

What we claim and desire to secure by Letters Patent is:

1. A process for the conversion of an alkyl chloride to an alkyl cyanide by metathesis with a metallic cyanide, in which the reaction is catalyzed by the presence of an iodide.

2. A process as claimed in claim 1 in which sodium iodide is the catalyst.

3. A process as claimed in claim 1 in which amyl chloride is the alkyl chloride used.

4. A process as claimed in claim 1 in which sodium cyanide is the metallic cyanide used.

5. A process as claimed in claim 1 in which a solvent is used in which each of the reactants is considerably soluble.

6. A process as claimed in claim 1 in which aqueous ethanol is used as solvent.

7. A process as claimed in claim 1 in which there is added an organic iodide capable of forming a metallic iodide under the conditions of the reaction.

In testimony whereof we affix our signatures.

HENRY BOHN HASS.
JERRY REUBEN MARSHALL.